United States Patent

Meilman

[11] Patent Number: 5,822,873
[45] Date of Patent: Oct. 20, 1998

[54] DEVICE FOR DETERMINING CANTS FOR SKIERS AND METHOD OF USE

[76] Inventor: Henry Meilman, 35 Caveswood La., Owings Mills, Md. 21117

[21] Appl. No.: 742,476

[22] Filed: Nov. 1, 1996

[51] Int. Cl.⁶ .................................................. G01C 9/00
[52] U.S. Cl. ............................................. 33/365; 33/512
[58] Field of Search .............................. 33/365, 366, 511, 33/512, 515; 128/782

[56] References Cited

U.S. PATENT DOCUMENTS

| | | | |
|---|---|---|---|
| 4,033,329 | 7/1977 | Gregory et al. | 33/515 |
| 4,302,962 | 12/1981 | Williams | 33/365 |
| 4,375,727 | 3/1983 | McAdams, Jr. et al. | 33/366 |
| 4,571,834 | 2/1986 | Fraser et al. | 33/512 |
| 4,662,079 | 5/1987 | Graf et al. | 33/512 |
| 4,700,479 | 10/1987 | Saito et al. | 33/366 |
| 4,811,492 | 3/1989 | Kakuta et al. | 33/366 |
| 5,080,109 | 1/1992 | Acme, Jr. | 33/515 |
| 5,148,606 | 9/1992 | Mason et al. | 33/512 |
| 5,161,810 | 11/1992 | DeCesare | 280/14.2 |
| 5,293,702 | 3/1994 | Miyoshi et al. | 36/117 |

OTHER PUBLICATIONS

Witherell et al, "The Athletic Skier", 1994, The Athletic Skier, Inc., Salt Lake City, UT.

*Primary Examiner*—G. Bradley Bennett
*Attorney, Agent, or Firm*—Leonard Bloom

[57] ABSTRACT

A device and method to measure and correct the cant of a pair of ski boots. A device has a pair of platforms movable with respect to one another. Binding means for the ski shoes are attached to the platform. Each platform is independently rotatable about a longitudinal center line. A pair of vertical indicators indicate the relationship between the respective knee of the skier and the vertical indicators. A second pair of indicators measure the degree of rotation of the respective platforms. Wedges are used to correct the cant and to obtain zero rotation of the respective platforms. The device can also be used to correct the cant of skis with ski boots attached.

20 Claims, 15 Drawing Sheets

DEVICE FOR DETERMINING CANTS FOR SKIERS AND METHOD OF USE

BACKGROUND OF THE INVENTION

The present invention relates to a device for determining cants for skiers, and more particularly, a device and method to measure the extent of cant and to correct the cant.

Skiing is a sport dependent upon proper anatomic alignment of the legs of the skier to the skis in order to maximize performance and efficiency and to minimize fatigue. It is generally accepted that all skiers should have a custom orthotic footbed made to improve the support provided by a ski boot and correct, as much as possible, any alignment problem related to the feet. Most ski boots (other than quite inexpensive ones) allow for the custom positioning of the ski boot cuff to accommodate differences in lower leg anatomy. Depending upon the body configuration of a particular skier and his (or her) stance or position in skiing, the skis could have a cant of up to 3° or so, in or out. The cant is taken as the angle between the top of the snow and a cross-sectional line at right angles to the longitudinal axis of the ski. Canting establishes the proper angle of the ski boot to the ski. There are two general means of changing the cant angle. One way is to place a wedge between the ski bindings (which hold the ski boot to the ski) and the ski. The other way is to cant the sole of the boot by grinding the base or using cantable soles as described in other patents. Canting has not been widely employed by recreational skiers because of the inadequate mechanisms for assessment of the proper canting angle. At the present time, the degree of cant is "eyeballed" by the sales person at the ski shop or, in the cases of Olympic and professional skiers, by their coaches who are professionally trained and experienced. The importance of canting is discussed in "The Athletic Skier" Witherell and Evrard, Published by the Athletic Skier, Inc., Salt Lake City, Utah (1994).

U.S. Pat. No. 4,375,727 to McAdams, Jr. et al disclose a cant angle sensor assembly utilizing a non-magnetic pendulum 24 suspended from the shaft of a resolver.

U.S. Pat. No. 4,700,479 to Saito et al disclose a cant angle sensor assembly which senses the amount of tilt of an object in the longitudinal, transverse, and oblique directions and utilizes a magnetic damper to exhibit damper action in all directions.

U.S. Pat. No. 4,811,492 to Kakuta et al disclose a cant angle sensor assembly for sensing the tilt of an object such as an agricultural tractor and utilizing a pendulum as the sensing member.

U.S. Pat. No. 5,161,810 to DeCesare discloses an ice skateboard with means for imparting a cant to the blades.

U.S. Pat. No. 5,293,702 to Miyoshi et al disclose a method and apparatus for selectively orienting a ski boot. At least three embodiments are disclosed. Boot soles are attached to the bottom surface of the boot body, and these soles have an alignment means for changing the attachment in a direction which is transverse to the longitudinal direction of the boot body and its bottom surface.

While some measurements may be taken of the ankle, calf, Achilles tendon or other parts of the anatomy, no apparatus exists which relates the anatomy and stance of the individual skier with respect to the ski and the ski boot. There is a need for a device to provide a reliable assessment of the need for canting and to permit the proper canting correction.

BRIEF SUMMARY OF THE INVENTION

It is an object of the present invention to provide a device for the reliable assessment and correction of improper ski angulation to be used after initial boot selection, orthotic use and adjustment.

It is a further object of the present invention to provide a device which is easily used with minimal training, is reliable and sturdy.

It is still another object of the present invention to provide a device and a method which is useful for any alpine ski boots conforming to international standards and for the ski boots attached to the skier's own skis.

In accordance with the teachings of the present invention, there is disclosed a device to measure and correct the cant of a pair of ski boots worn by a skier. The device includes a pair of articulated platforms, independently laterally movable with respect to one another. Each articulated platform has a center line along a longitudinal plane. Binders are attached to each articulated platform to hold the ski boots of the skier. Each articulated platform is independently rotatable about the longitudinal center line. A vertical indicator extends upwardly from the longitudinal center line of each articulated platform. Means are provided to indicate a relationship between a center of mass of the respective knee of the skier and the longitudinal plane of the respective articulated platform. A pair of second indicators, one attached to each articulated platform measures the degree of rotation of each articulated platform plane, indicating the cant. A means is provided to insert wedges to correct the cant of respective ski boots to obtain 0° of rotation of the second indicator means.

The present invention further discloses each respective articulated platform has a boot plate to which the binder is connected. The boot plate has an edge pivotally connected to a first edge of an intermediate plate. The intermediate plate has an opposite second edge pivotally connected to an edge of a base plate. The plates are pivotally separated when the ski boots are canted. The wedge having a corrective angle is inserted between the separated plates.

The present invention additionally discloses each ski boot has a heel and a toe. The articulated platforms have means thereon for elevating the heels of the ski boots with respect to the toes to simulate downhill skiing and to permit improved correction of the cant.

The present invention also discloses means for connecting a pair of skis to the articulated platforms, one ski on each platform, each ski having the respective ski boot bound thereto, wherein correction of the cant may be made directly on the ski and ski boot combination.

The present invention further discloses a device to measure and correct the cant of a ski boot worn by a skier. A frame has a rotatable platform to which the ski boot is removably attached, wherein the skier wears the boot while supported on the platform. A first vertical indicator means is perpendicularly connected to the frame. Means are provided to measure an angular relationship between a center of mass of the knee of the skier and the first indicator means. A second indicator is attached to the platform. The second indicator indicates the rotation of the platform indicating the cant. Means are provided to insert a wedge into the device to correct the cant.

A method is disclosed of correcting the cant of a ski boot worn by a skier using the device of the present invention.

These and other objects of the present invention will become apparent from a reading of the following specification taken in conjunction with the enclosed drawings.

DESCRIPTION

Figure 1:
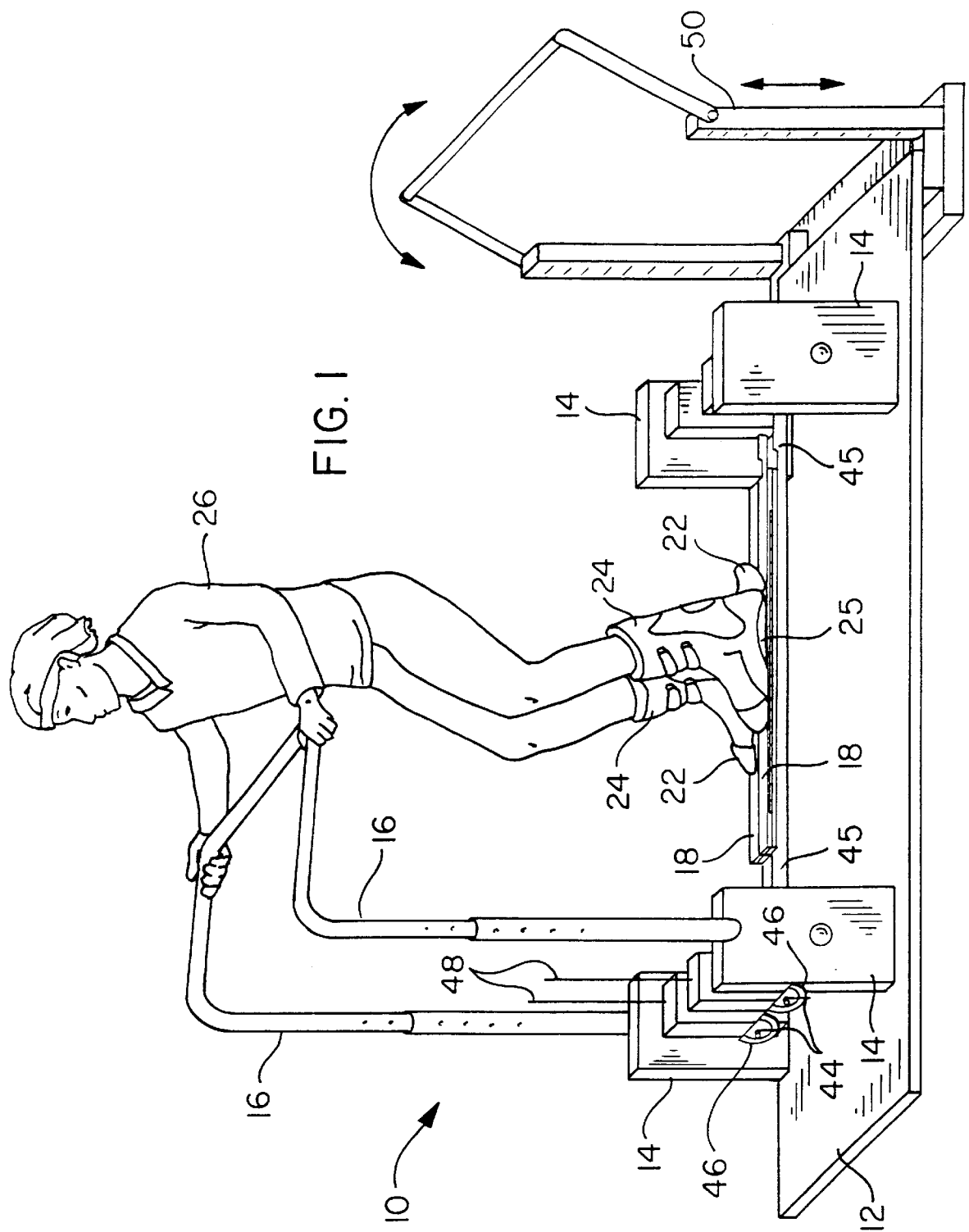
FIG. 1 is a perspective view of the device of the present invention showing a skier using the device.
Figure 2:
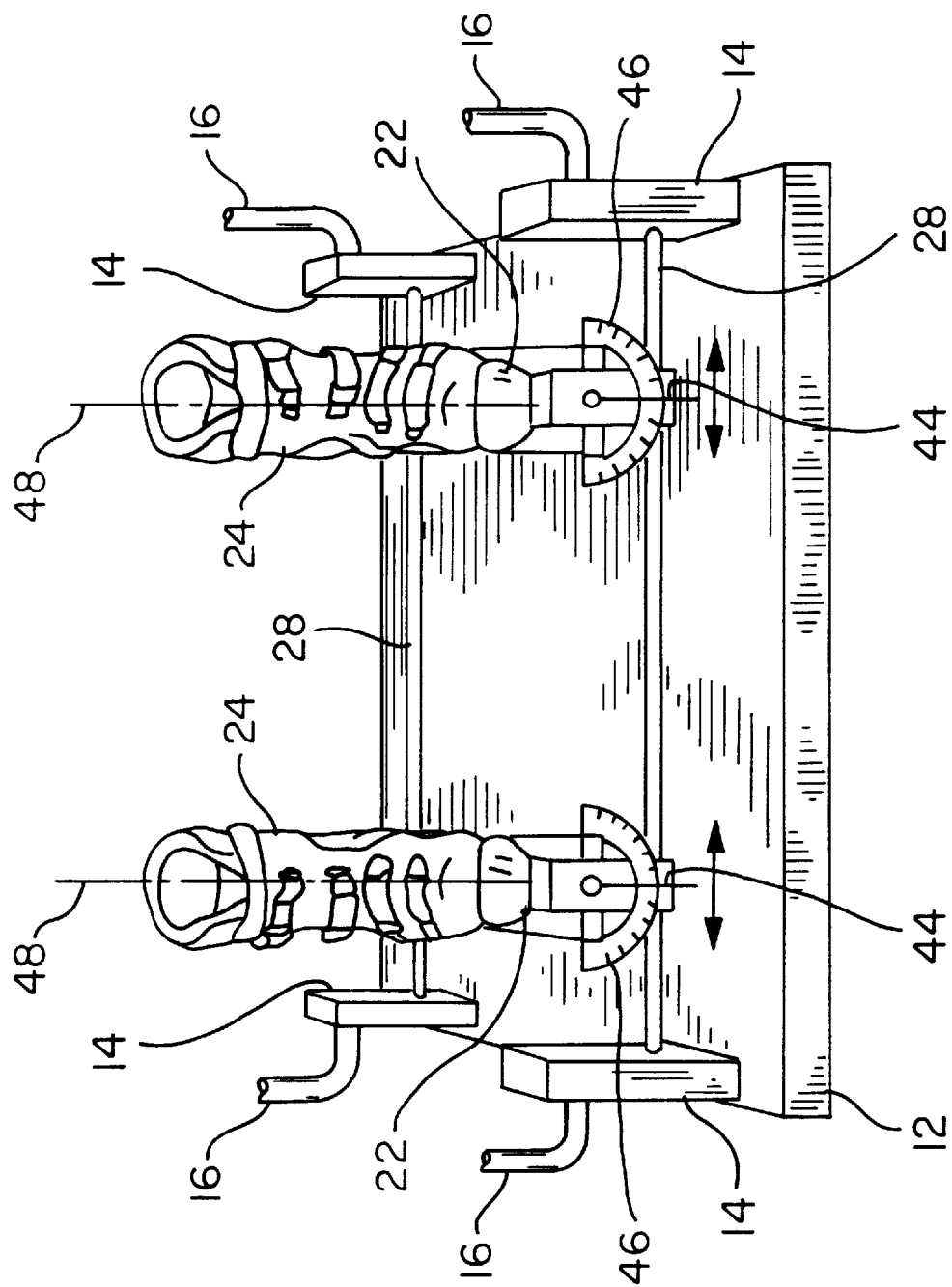
FIG. 2 is a front perspective view of the device of the present invention.
Figure 3:
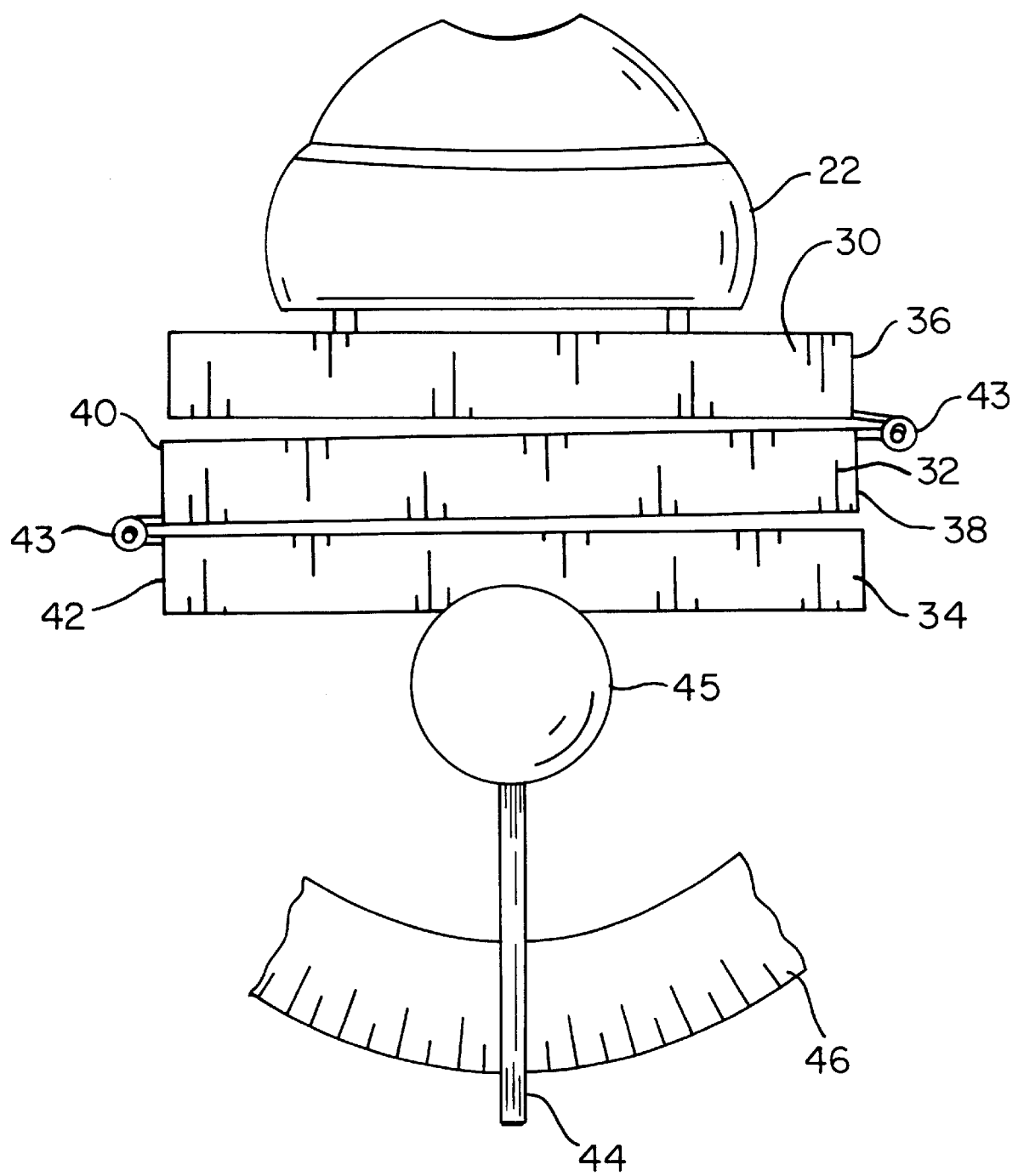
FIG. 3 is an enlarged front view showing a ski boot binding on an articulated platform with an indicator means.
Figure 4:
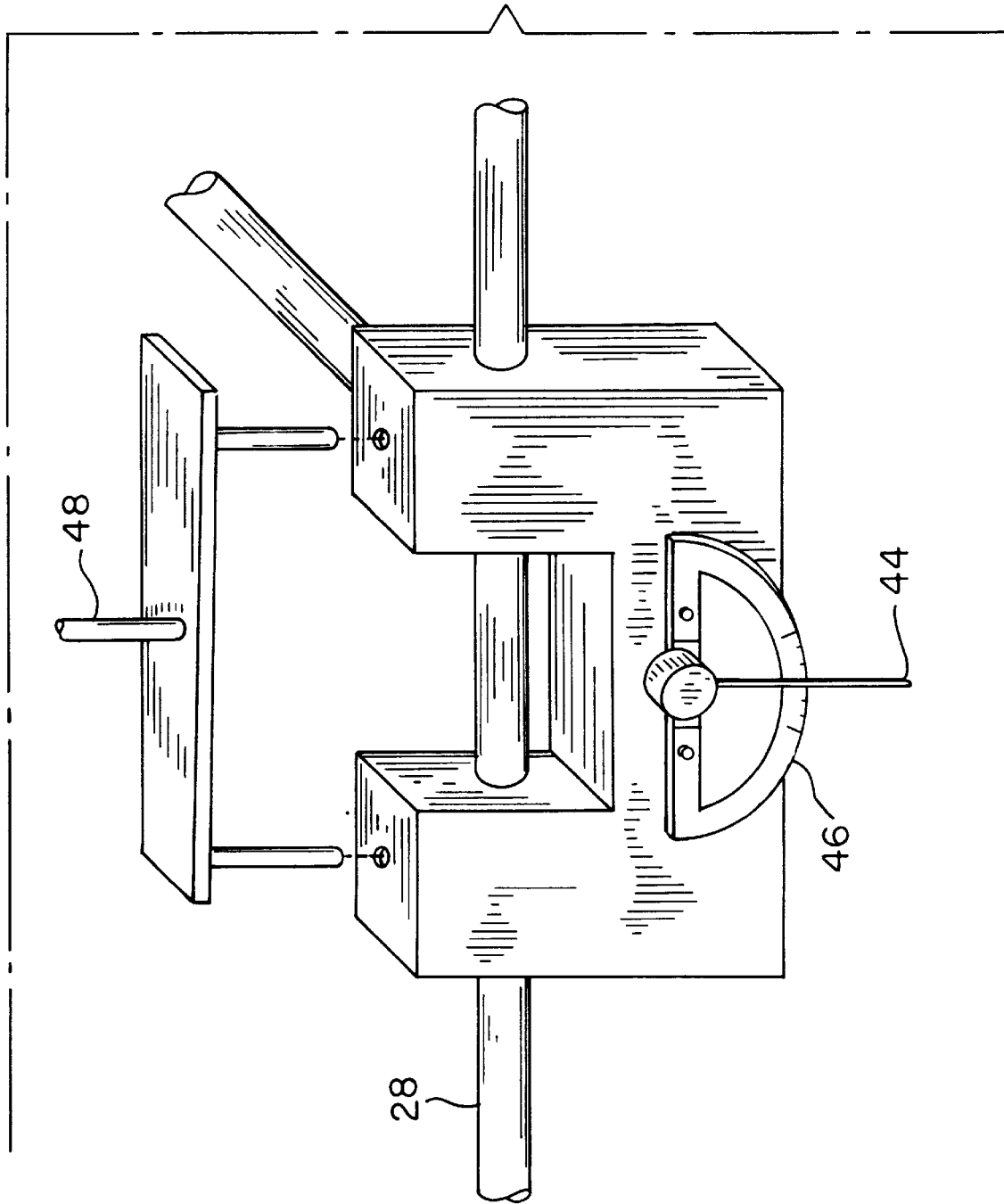
FIG. 4 is a perspective view showing a portion of the front of the platform having the first indicator means removably connected.
Figure 5:
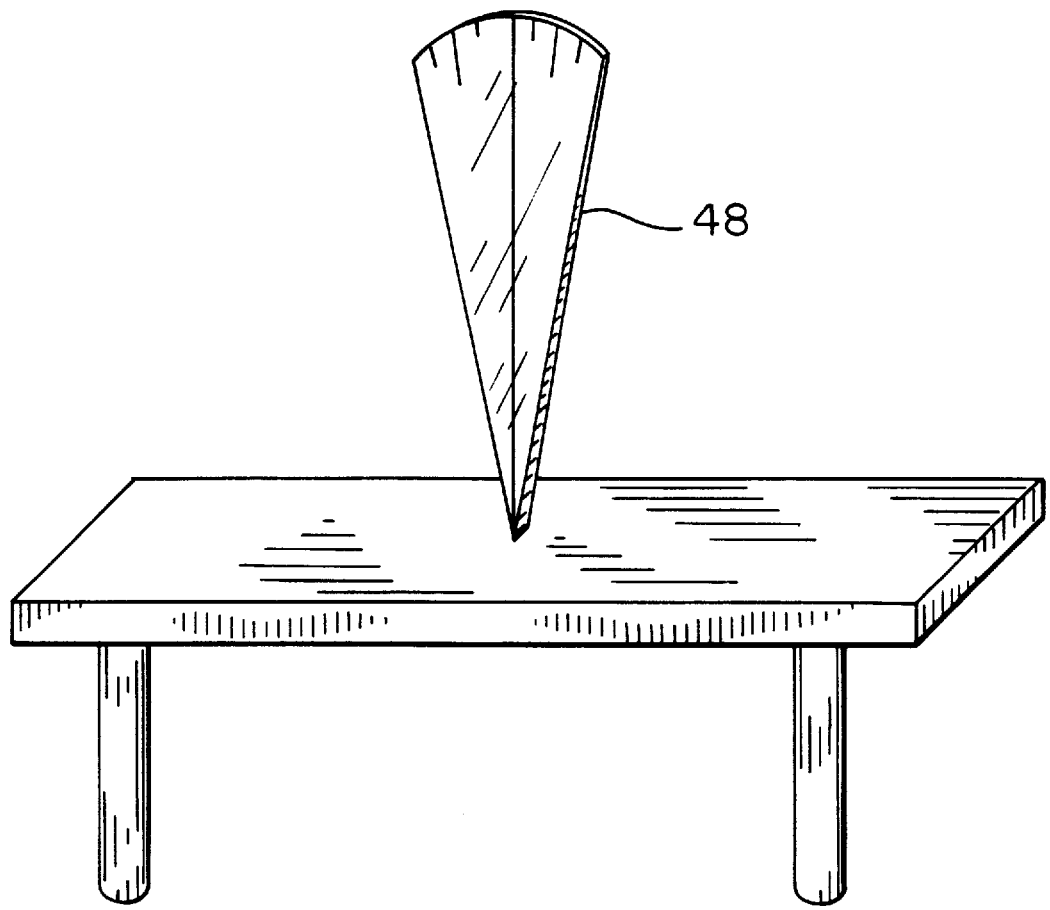
FIG. 5 is a front view of an alternate embodiment of the first indicator means.
Figure 6:
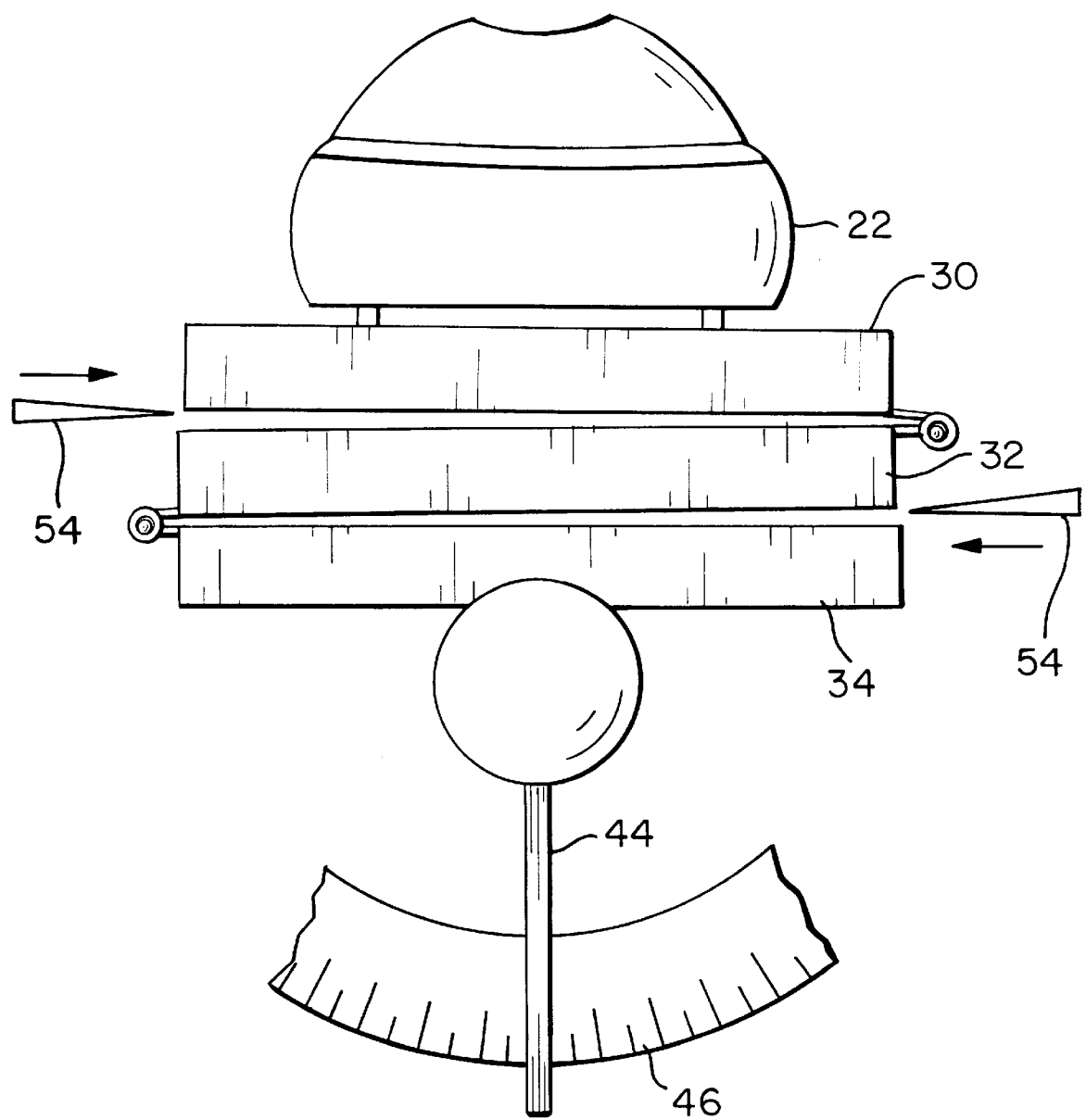
FIG. 6 is an enlarged front view of the present invention showing insertion of wedges in the articulated platform.
Figure 7:
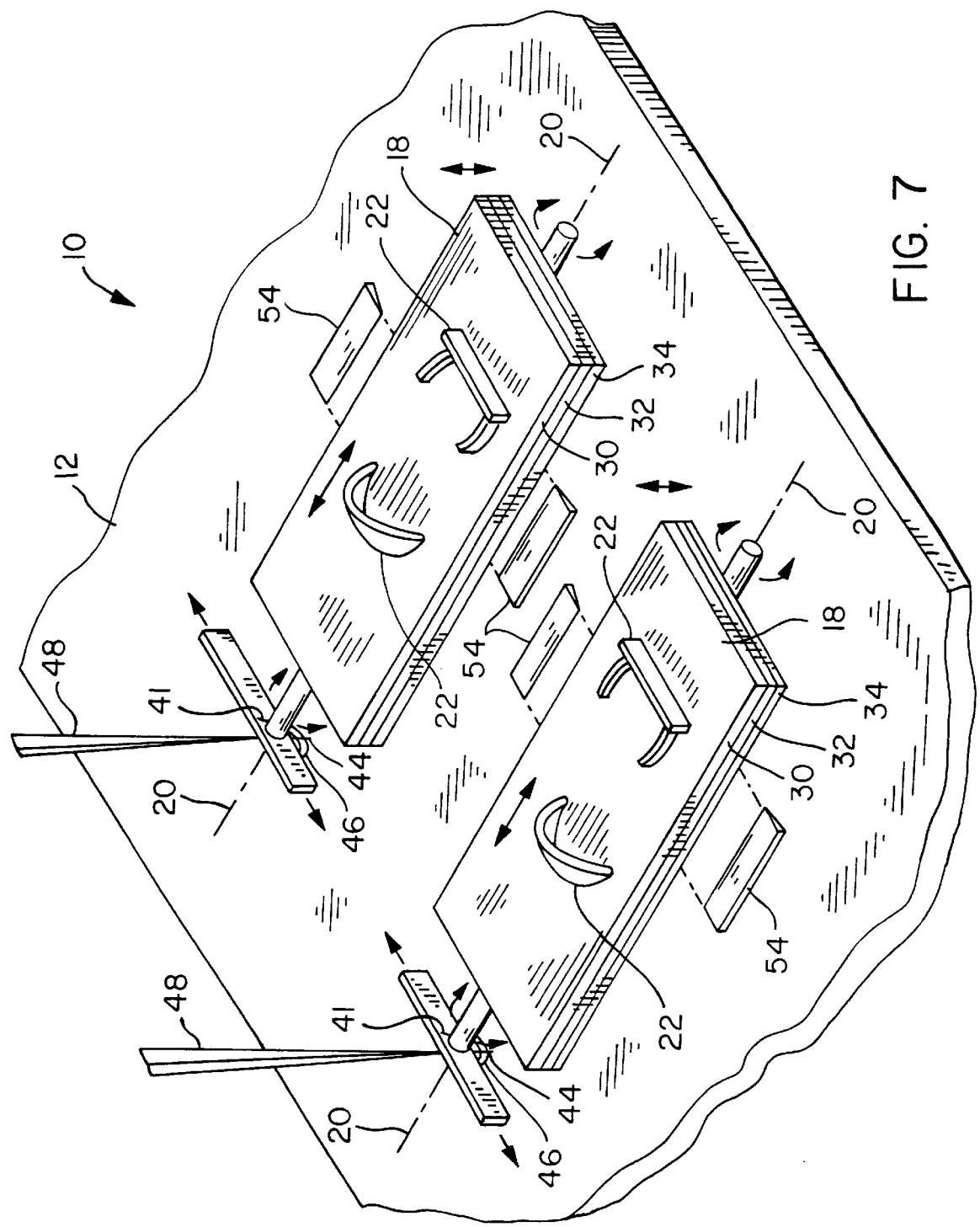
FIG. 7 is a schematic view showing the present invention and the relative movement of the components.
Figure 8:
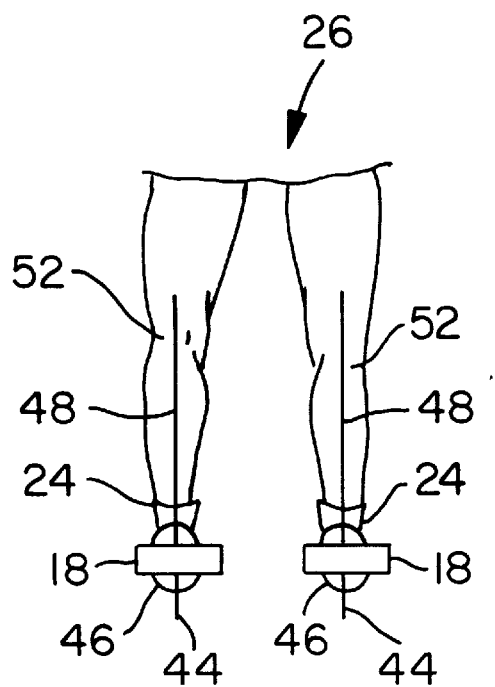
FIG. 8 is a front view showing the legs of the skier in a natural stance and typical indicator positions.
Figure 9:
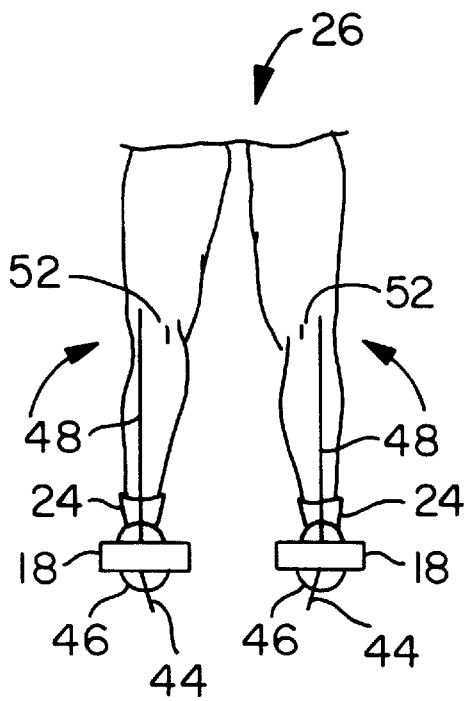
FIG. 9 is a front view showing movement of the legs to proper alignment of the center of mass of the knee with respect to the first indicator.
Figure 10:
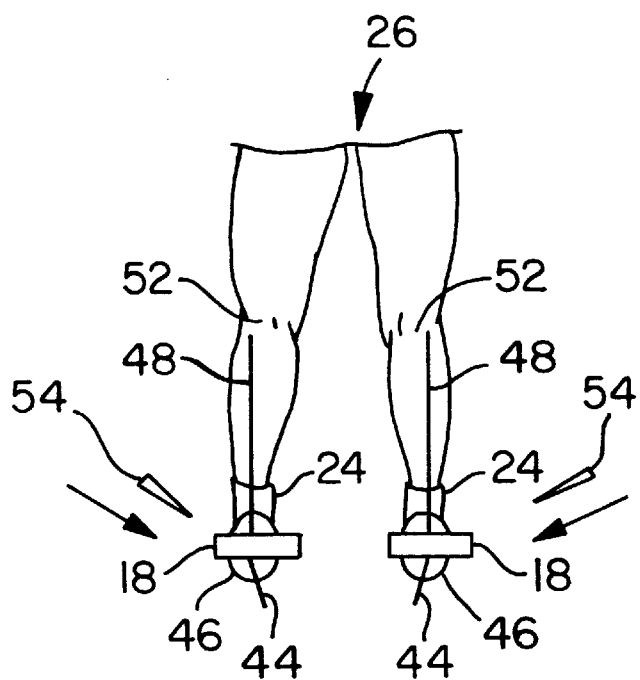
FIG. 10 is a front view showing insertion of wedges to correct the displacement of the second indicator.
Figure 11:
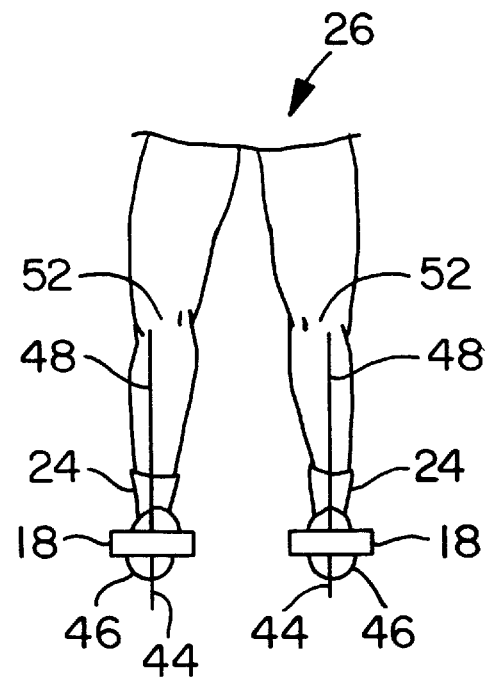
FIG. 11 is a front view showing the correctly canted ski boot.

Referring to FIGS. 1–7, the device 10 of the present invention has a frame 12 which is supported on the floor. The frame 12 preferably, has four (4) vertical support means 14. One pair of vertical support means 14 are disposed near each side of the frame 12. Two of the vertical support means 14 are near the front of the frame 12 and two are near the back of the frame 12. A pair of support rails 16 are mounted on respective sides of the frame 12 and preferably on the vertical support means 14. The support rails may telescope to be vertically adjustable to accommodate skiers of differing heights.

Mounted within the frame are a pair of articulated platforms 18. Each platform has a center line 20 along a longitudinal plane. An adjustable binder 22 is attached to each platform 18 to hold the ski boots 24 of the skier 26. The skier 26 places each ski boot 24 in the respective binding means 22 and stands upright in the skier's natural skiing stance. The binder 22 is adjustable to accommodate all size ski boots 24 and clamps firmly to the ski boot 24 in a manner similar to the binding of the ski boot to the ski, having a toe binding and a heel binding. The sole 25 of the ski boot 24 is in the same horizontal plane as the platform 18.

Each platform 18 is mounted on a lateral support 28. Preferably, two lateral supports 28 are provided, one in front of the binder 22 and one in back of the binder 22. In this manner the lateral supports 28 are connected between the respective vertical support means 14 on each side of the frame 12. The platforms 18 are independently laterally movable with respect to one another. This permits the skier to spread his (or her) feet apart and to assume his or her normal stance in skiing. The lateral movement will have some resilient or frictional resistance, so that the adjustment may be maintained but may be manually over-ridden if desired.

Each articulated platform 18 further consists of a boot plate 30, an intermediate plate 32 and a base plate 34 disposed in a stacked arrangement. It is preferred that each plate be of an equal length. The binder 22 for the ski boots 24 is removably connected to the upper surface of the boot plate 30. The boot plate 30 has a first edge 36 which is pivotally connected to a first edge 38 of the intermediate plate 32. A second opposite edge 40 of the intermediate plate 32 is pivotally connected to a first edge 42 of the base plate 34. Preferably, the pivot connections between the plates are by a respective piano hinge having a hinge pin which extends the full length of each respective plate.

Each articulated platform 18 is mounted on a beam 45 and is independently rotatable about the longitudinal center line 20 to accommodate the variations in the stance of the individual skier. This rotational movement has some resilient or frictional resistance to prevent uncontrolled rotations. A beam or reinforcing member 45 extends beyond the length of the respective platform 18 and is received in a front and rear bushing in a portion of the frame 12 to permit rotation of the respective platform. Other means known to persons skilled in the art may be used to rotatably mount the respective platforms in the frame 12. Preferably, the degree of rotation is limited, by locking pins or other suitable means, to a rotation of 5° clockwise and 5° counterclockwise from a center position.

On the front of each rotatable platform 18, there is mounted a respective indicator means 44 which displays the rotation of the platform 18. Preferably, the respective indicator means 44 is directly connected to the respective platform 18 so that there is a one-to-one correlation between the position of the platform 18 and the position of the indicator means 44. The angle of rotation of one platform 18 is independent of the angle of rotation of the other platform 18 as will be described. Further, it is preferred that each indicator means 44 be disposed immediately in front of a respective indicator scale 46 so that the extent of rotation or deflection of the longitudinal plane from a reference line (indicated by "0") is readily discerned. The indicator means 44 may be a pointer directed vertically or horizontally with respect to the frame 12. Also, bubble-type indicators may be used.

Also mounted on the front of the frame 12, are a pair of vertical indicator means 48, one vertical indicator means being in front of each platform 18. Each vertical indicator means 48 extends upwardly perpendicularly from the center line of each respective platform 18. Each vertical indicator means 48 has two opposite ends. Preferably there is an apex at the end which is mounted on the frame 12 and the vertical indicator is fan-shaped, having a wider end extending upwardly. A perpendicular center line is marked on each vertical indicator 48 and, preferably, the vertical indicator 48 is further marked to indicate lines extending from the apex, 1°, 1.5°, 2° and 3° on either side of the perpendicular center line. The significance of these markings will be described.

The markings are not limited to the above angles. The vertical indicator means 48 may be removably attached to the frame 12 in front of each platform. This feature is desirable when the device 10 is used with a long ski 49 and the ski extends beyond the front of the frame 12. In this situation, the vertical indicator means 48 would interfere with the use of the ski if the indicator means were not removable.

Attached to the back of the frame 12 and connected to the platform 18, there is an adjusting means 50 to raise or lower the respective platforms 18. This provides a means to elevate the heels of the ski boots 24 with respect to the toes of the ski boots to simulate down hill skiing and to permit corrections of the cant in this situation, as will be described. The adjusting means 50 may be a screw jack, a cam, a ratchet, or other means known to persons skilled in the art. The adjusting means 50 may be powered manually, electrically,. hydraulically or pneumatically.

In this manner, the platforms 18 on the device 10 have three modes of movement. The respective platforms 18 are movable laterally with respect to one another. The respective platforms 18 are each individually rotatable about a respective center longitudinal axis and the backs of the respective platforms 18 are each adjustable vertically to simulate down hill skiing (See FIG. 7).

In use as shown in FIGS. 8–11, the skier puts on his/her ski boots 24 and binds the ski boots to the adjustable binding means 22 on the boot plate 30. The skier takes a natural stance moving the respective platforms 18 laterally with respect to one another to a spacing with the skier's feet separated, comfortable to the skier. The skier's knees preferably are bent to a skiing posture. The locking pins 41 are unlocked permitting the respective platforms 18 to rotate about the longitudinal axis 20 to an angle which accommodates the natural stance of the skier. The center of mass 52 of the skier's knees are identified and are positioned to be inwardly of the vertical indicator means 48 at a predetermined angle (preferably 1.5°) from the perpendicular center line of the vertical indicator means. The vertical indicator 48 preferably has a plurality of angles marked thereon to permit a predetermined angle to be selected and to align the knee as desired. Angular indicators, scales, optical devices and other devices may be used to indicate the angular relationship between the vertical indicator and the center of mass of the knee of the skier. When this position is obtained, the indicator means 44 on each platform is observed. Any deviation from the zero reference line is noted as indicated on the indicator scale 46. The deviation from the zero reference line is an indication that the cant is in need of correction and is also an indication of the degree of rotation of the sole 25 of the boot 24 from the horizontal plane along a longitudinal axis. The plates 30, 32 and 34 are observed to determine the pivoted relationship of the plates. A wedge or wedges 54 are placed between the appropriate plates 30, 32 and 34 to produce a null between the indicator means 44 and the indicator scale 46. That is, the narrow edge of a wedge 54 having an angle, for example 1°, is placed between the boot plates 30 and the intermediate plates 32, if the indicator means 44 is deflected to the right of the center line. If the indicator means 44 is deflected to the left of the center line, the narrow edge of the wedge 54 is placed between the intermediate plate 32 and the base plate 34. Where the indicator is a horizontal pointer, deflection above and below a reference point are noted. It is preferred that the markings on the indicator scale 46 be directly related to the angle of the wedge 54. A plurality of wedges 54 having different slopes are provided to permit correction of the cant. The wedge 54 (or shim) preferably, is a molded plastic item approximately two to three inches long (or longer) and approximately two inches wide. Wedges having tapers of 1°, 2°, 3° etc. are provided, including fractions of degrees (such as "quarters").

The correction is made for each of the platforms 18 and is reviewed to ensure that correction of one platform 18 has not produced a deflection in the other platform 18. The back of the platforms 18 are elevated to place the platforms 18 in a forward inclined position and the above procedure is repeated to assure proper correction under conditions that more closely approximate skiing load and tension. A height adjustment in which the rear of the binding is elevated by approximately one foot is preferred.

The correction which has been determined is applied to the user's skiing equipment. In one application, the bolts on the binding on the user's skis are removed and the wedge of the proper taper as determined by the device 10, is placed between the boot and the ski. The wedge has a plurality of holes therethrough so that when the bolts on the binding are replaced, the bolts are received through the holes and the correction is incorporated. The wedge is inserted from either side of the binding as required to correct the natural tendency of the particular skier to cant in or out on the particular leg.

Some commercially available ski boots have means between the body of the boot and the sole/heel wherein wedges or shims can be inserted. In these boots, the wedge 54 is inserted into the means in the ski boot rather than between the binding and the ski. The advantage of this type of boot is that the ski boot can be used with any pair of skis and no cant correction is required for the particular ski. The cant correction has been made to the specific boot for the individual skier.

Thus, using the device 10 of the present invention, persons with minimal training can measure the correction required due to the anatomy or stance of the particular skier and/or the design and configuration of the ski boots. The device 10 accurately determines the proper wedge and properly compensates for the natural canting tendency (in or out) and there is no "eye balling" or "hit or miss" as in the prior art manual method.

By properly compensating for the natural cant, the skier will find skiing to be easier and hence more enjoyable.

It is also highly desirable to use the device 10 to correct the cant on the skier's personal skis in combination with their ski boots.

Figure 12:
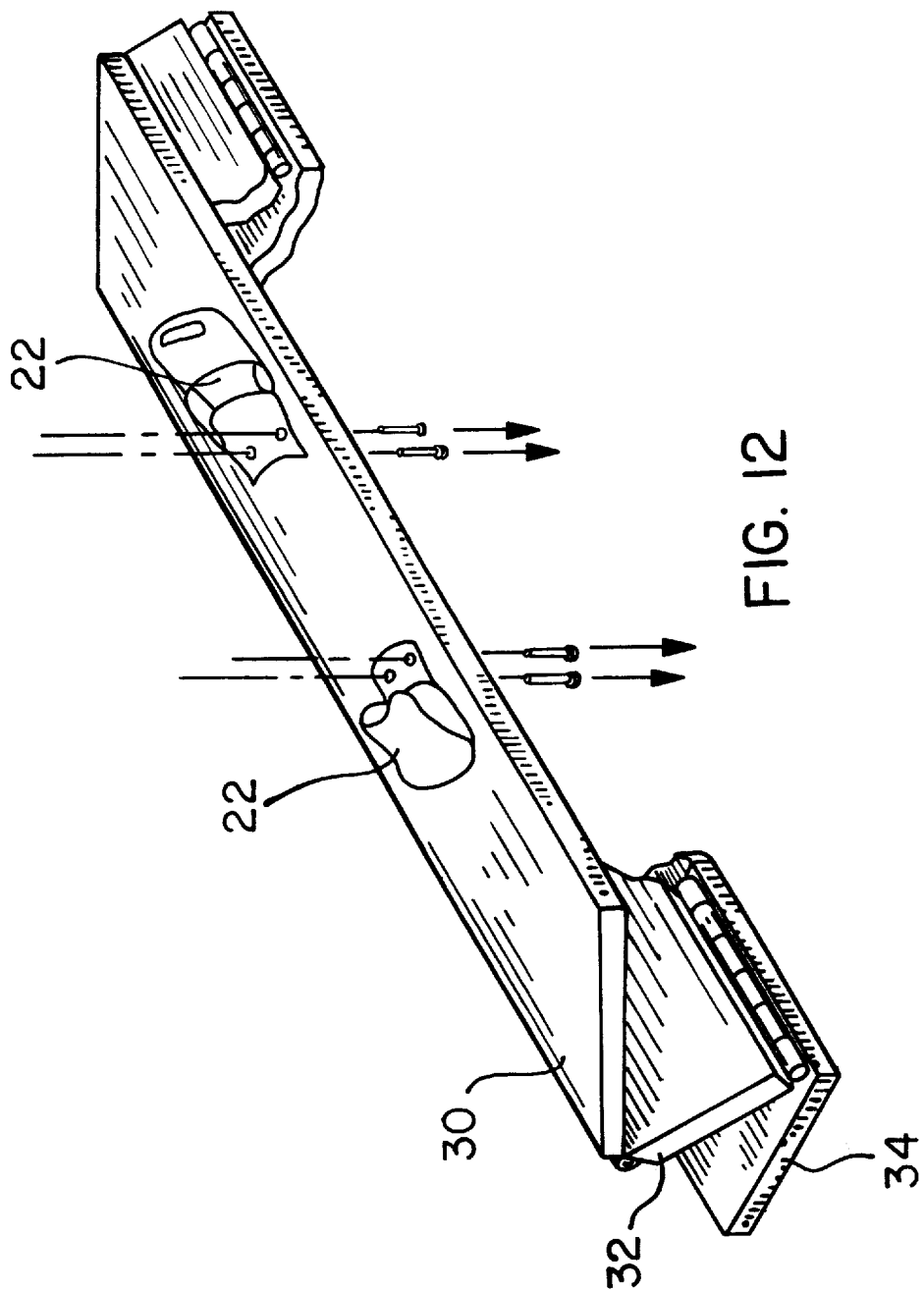
FIG. 12 is a partial cutaway perspective view showing removal of the binding means from the boot plate.
Figure 13:
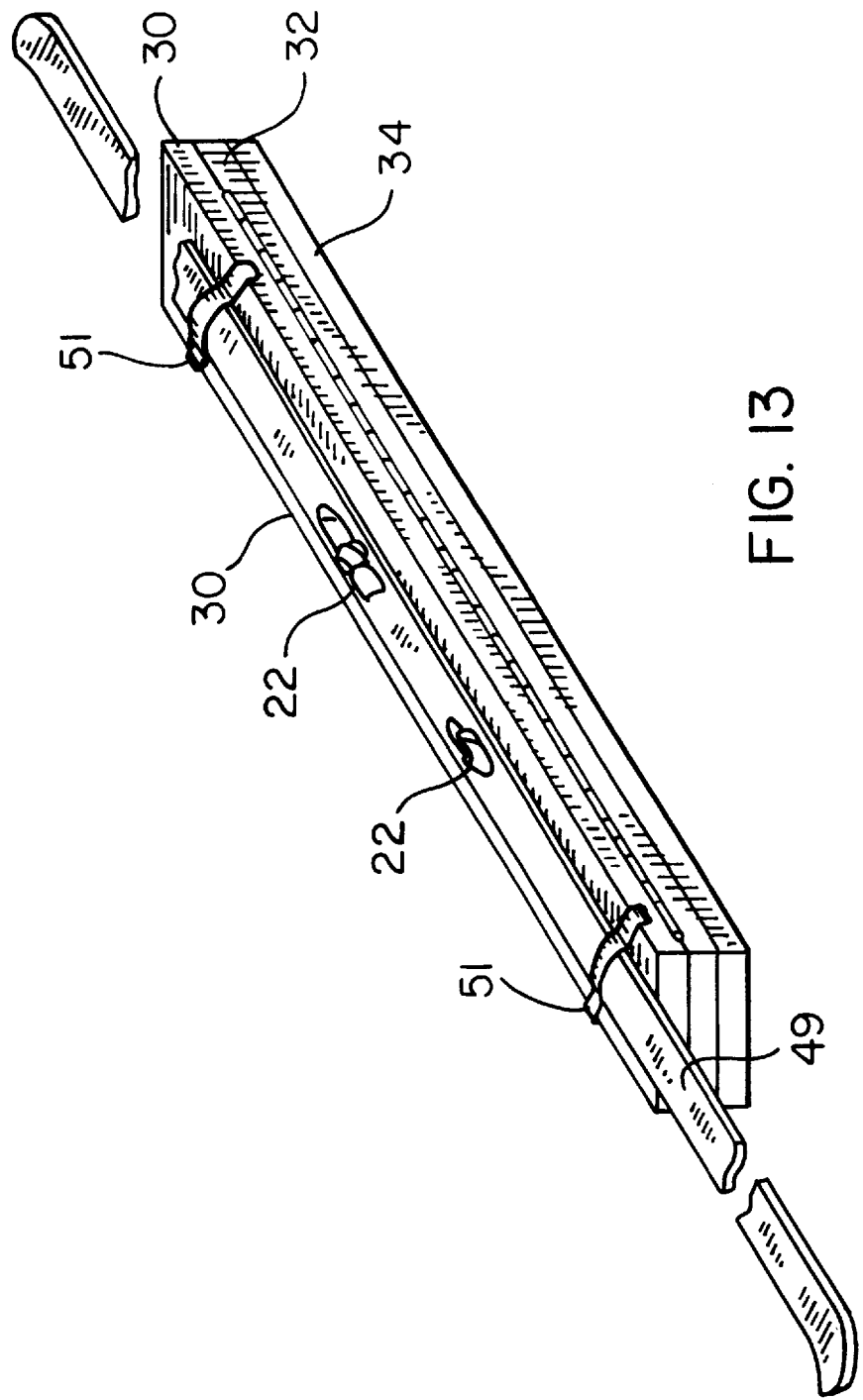
FIG. 13 is a perspective view showing the ski attached to the boot plate of the platform.

One method of accomplishing this is to remove the binding means 22 from the boot plate 30 on the device 10 as for example, removing the bolts which secure the binding means 22 to the boot plate 30 and clamp 51, or otherwise attach, the individual skis to the boot plate 30 on each platform 18 (FIGS. 12–13). The skis 49 may extend forwardly and backwardly beyond the frame 12 of the device 10. The device 10 is then used in the manner as described above and the correction wedges are inserted between the ski boot and the ski 49. This method permits correction of the individual's actual ski equipment but requires the removal of the binding from the device. This is time consuming and introduces the potential that, after repeated interchanges, the accuracy of the device may be affected.

An alternate embodiment for each platform 18, is to provide a replacement boot plate 30' for the boot plate with the binding means 22 attached thereto. The replacement boot plate 30' has no binding means but rather has at least one clamp 51' thereon to secure the ski 49 to the boot plate 30'.

Figure 14:
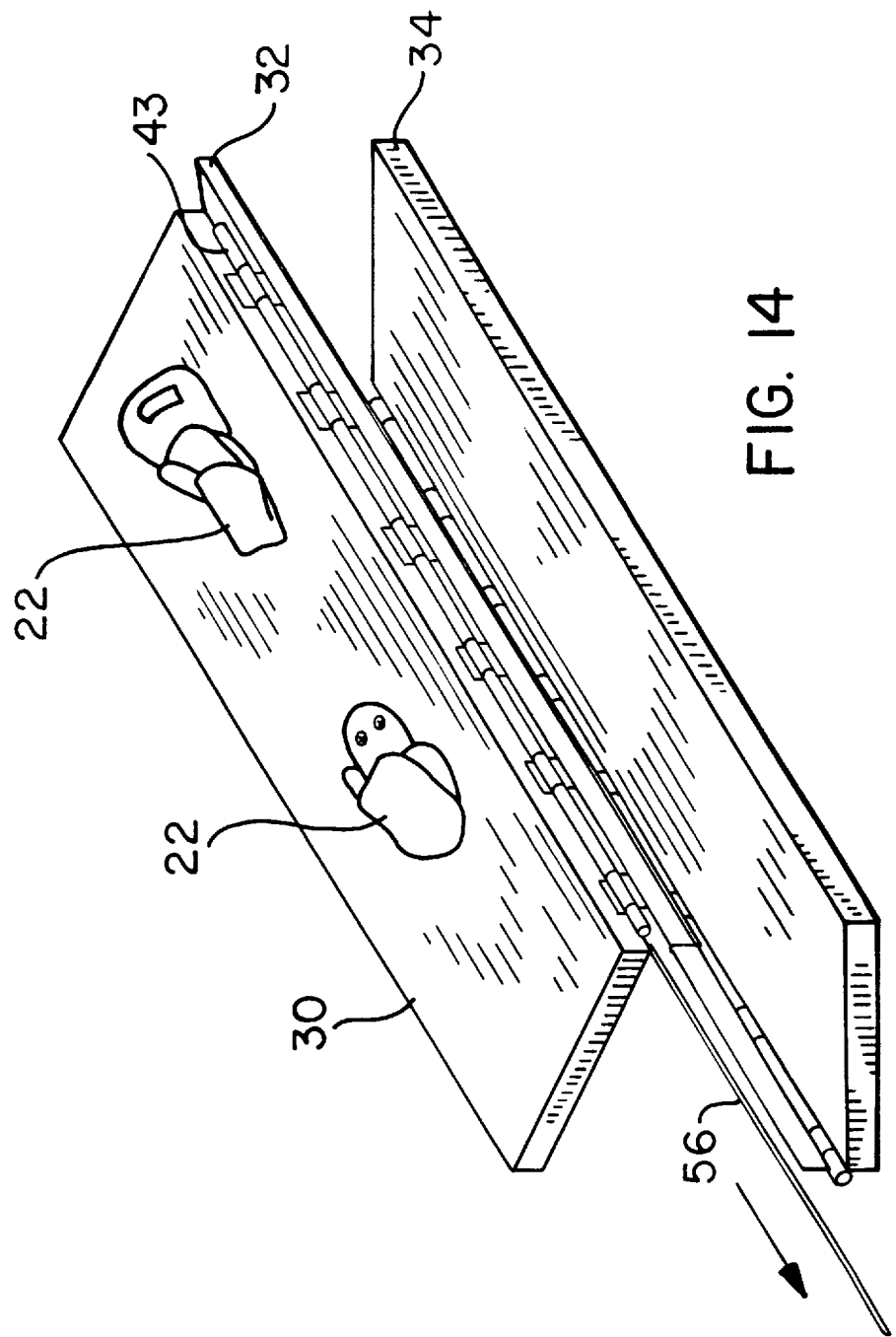
FIG. 14 is a perspective view showing the boot plate with the attached binding means being separated from the intermediate plate by removal of the hinge pin.
Figure 15:
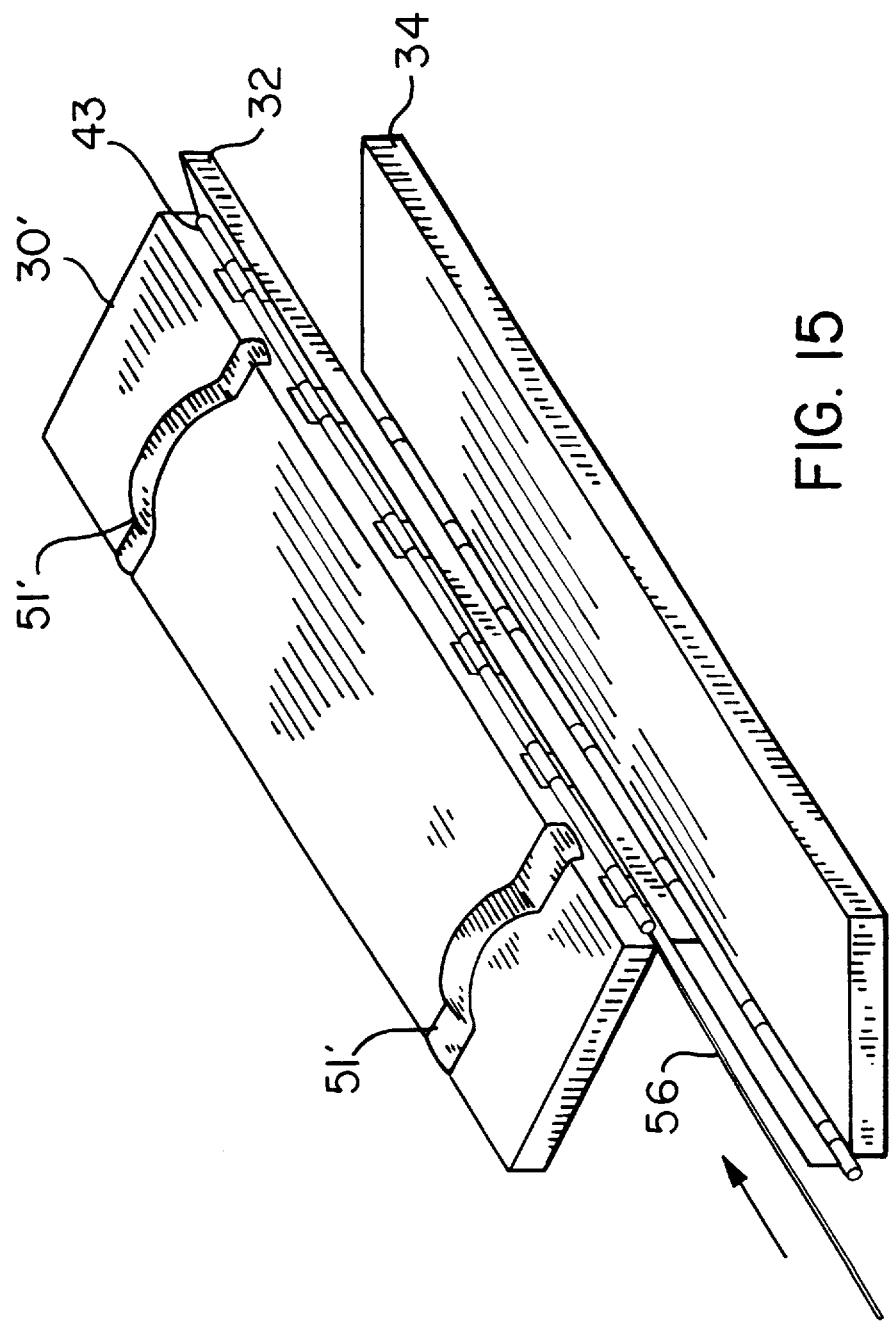
FIG. 15 is a perspective view showing the reinsertion of the hinge pin to attach a boot plate to the intermediate plate for connection of a ski to the platform.

The boot plate 30 is removed from the respective platform 18 by withdrawing the hinge pin 56 from the pivotal connection between the first edge 36 of the boot plate 30 and the first edge 38 of the intermediate plate 32. The replacement boot plate 30' is disposed on top of the intermediate plate 32 with the pivotal connection aligned and the hinge pin 56 is reinserted so that the replacement boot plate 30' is pivotally connected to the intermediate plate. The skier's ski 49 is clamped or otherwise attached to the replacement boot plate 30' and the device is used as described above (FIGS. 14–15). After correction for cant, the skis 49 are unattached from the replacement boot plate and the device 10 is available for reuse with either skis or, by reinsertion of the original boot plate 30, for use with ski boots only.

Figure 16:
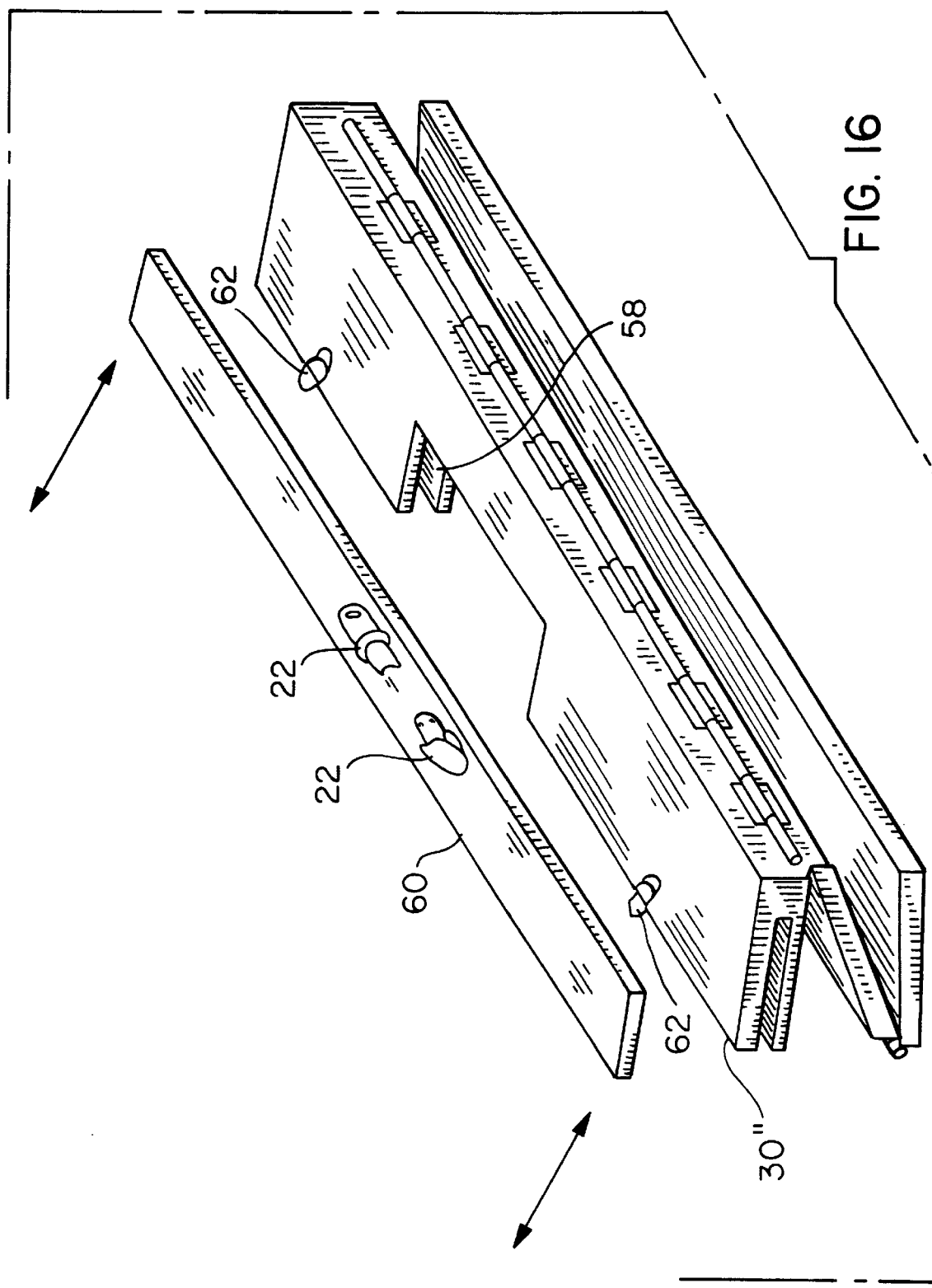
FIG. 16 is a perspective view of a U-shaped boot plate and an insert plate to be received in the boot plate.
Figure 17:
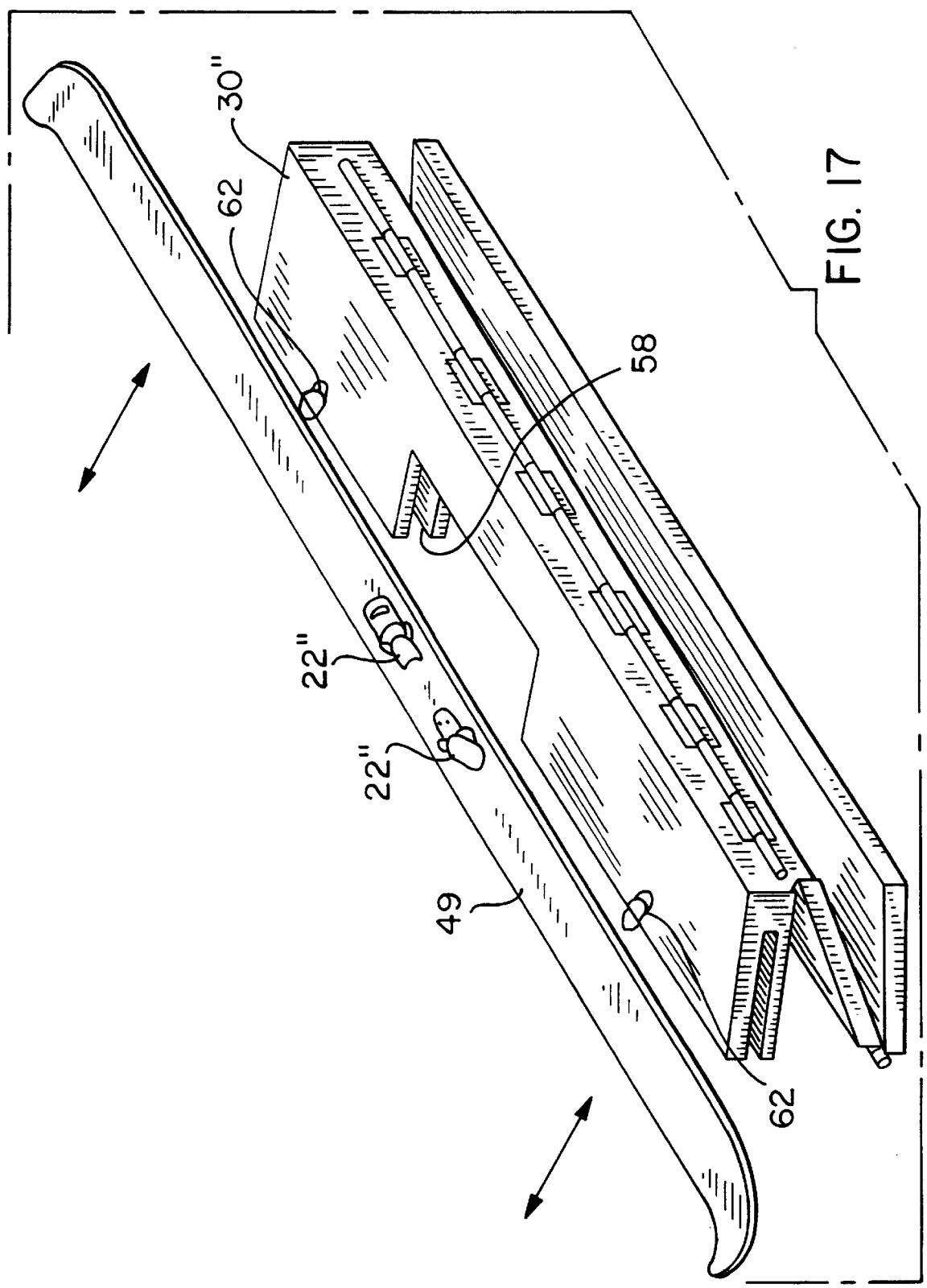
FIG. 17 is a perspective view of a U-shaped boot plate and a ski to be received in the boot plate.

In another embodiment (FIGS. 16–17), the boot plate 30" is U-shaped. The base of the "U" is the first edge 36 of the boot plate 30" and is pivotally connected to the first edge 38 of the intermediate plate 32. Legs of the U-shaped boot plate extend substantially perpendicular to the first edge 36 of the boot plate. The boot plate 30" has a space 58 therein where a segment is removed at approximately the midsection of the boot plate 30", equidistant from the front and the back. The space 58 extends partially inwardly from the side of the boot plate 30" opposite the first edge 36 but does not extend completely to the first edge such that the integrity of the boot plate 30" is maintained. An insert plate 60 is provided to be received between the legs of the U-shaped boot plate 30". The adjustable binding means 22 are attached to the insert plate 60. When the insert plate 60 is inserted laterally between the legs of the U-shaped boot plate 30", the binding means 22 are aligned with the space 58 and extend upwardly through the space 58 so that ski boots 24 may be bound therein as previously described. It is preferred that the insert plate have a length approximately equal to the length of the boot plate 30" but shorter lengths can be used. The minimum length of the insert plate must be greater than the length of the space 58 to assure retention of the insert plate 58 within the U-shaped boot plate 30". At least two securing means 62 such as clasps, latches etc. are provided on the open portion of the U-shaped boot plate 30" along an edge opposite to the base of the "U" (the first edge 36). After the insert plate 58 is disposed in the U-shaped boot plate 30", the securing means 62 are engaged to retain the insert plate 58 within the U-shaped boot plate 30". When a skier wants to wear his/her individual skis 49 for cant correction, the insert plate 58 is removed and the respective skis 49 are received laterally between the legs of the U-shaped plate 30" on each of the platforms 18. The bindings 22" on the skis 49 are aligned with the respective spaces 58 on the U-shaped boot plate 30" and the skis 49 are secured with the securing means 62. The device 10 is used as described above to correct the cant of the particular ski/ski boot combination as worn by a particular skier.

Figure 18:
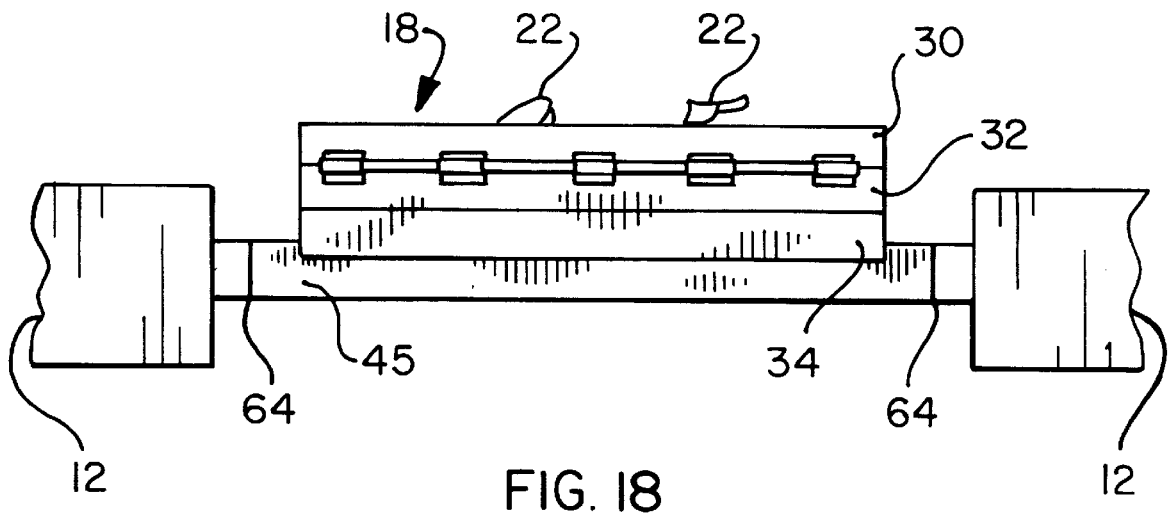
FIG. 18 is a side elevation view of one set of replaceable platforms having a boot plate with attached binding means.
Figure 19:
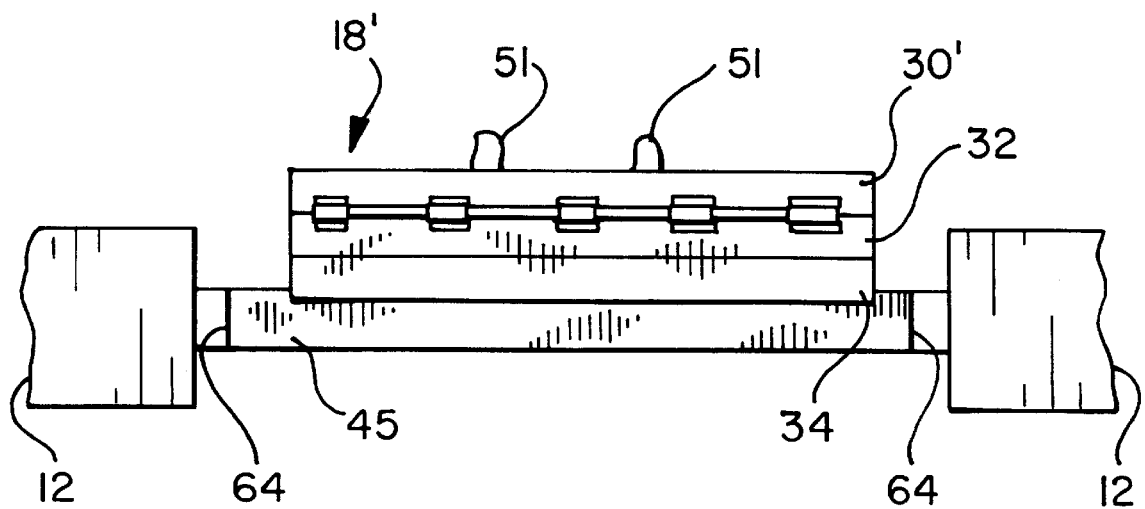
FIG. 19 is a side elevation view of another set of replaceable platforms having a boot plate with clamps to hold a ski.

In a further embodiment as shown in FIGS. 18–19, two sets of replaceable platforms are provided. The individual replaceable platform of each set constitutes a separate unit. One set of replaceable platforms 18 has adjustable binding means 22 attached to the boot plate 30 as described above. The other set of replaceable platforms 18' has a boot plate 30' without the binding means 22 attached thereon but having at least one clamp 51 thereon to secure the ski 49 to the boot plate 30'. The front and rear of the beam or reinforcing member 45 of each set are releasably connected 64 to a support means on the frame 12. In this manner, the sets of replaceable platforms are interchangeable to permit cant correction of the ski boot or the combined ski boot and ski. The releasable connection 64 between the beam or reinforcing member 45 may be removable bolts, quick release pins, threaded joints or other means known to persons skilled in the art.

The above described embodiments allow the device to be used by a particular skier with his/her own skis to assess the cant correction. The device 10 permits complete assessment of boots with cantable or ground soles, or the need for canting of regular ski boots. The device 10 is usable with any alpine ski boot conforming to international industry standards.

The frame 12 has sufficient width and length to provide stability and to prevent movement or tilting of the device 10. For safety, it is preferred that the support rails 16 be padded. It is also preferred that level indicators and leveling means be provided on the frame to assure reproducibility of the measurements.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A device to measure and correct the cant of a pair of ski boots worn by a skier, the device comprising:

a pair of articulated platforms, independently laterally movable with respect to one another, each articulated platform having a center line along a longitudinal plane, a respective binder attached to each articulated platform to hold the ski boots of the skier, each articulated platform being independently rotatable about the longitudinal center line, a vertical indicator means extending upwardly perpendicularly from the longitudinal center lines of each articulated platform, means to indicate a relationship between a center of mass of the respective knee of the skier and the vertical indicator means, a pair of second indicators, one attached to each articulated platform, the second indicators measuring the degree of rotation of each articulated platform, indicating the cant, and means to insert a wedge into the device to correct the cant of each respective ski boot to obtain 0° of rotation of the respective second indicator means.

2. The device of claim 1, wherein the corrective wedges are inserted into means provided in the respective ski boots.

3. The device of claim 1, wherein each ski boot has a heel and a toe, the articulated platform having means thereon for elevating the heels of the ski boots with respect to the toes to simulate downhill skiing and to permit correction of the cant.

4. The device of claim 1, wherein each respective articulated platform has a boot plate to which the binder is connected, the boot plate having an edge pivotally connected to a first edge of an intermediate plate, the intermediate plate having an opposite second edge pivotally connected to an edge of a base plate.

5. The device of claim 4, wherein the plates are pivotally separated when the ski boots are canted, the wedge having a corrective angle being inserted between the separated plates.

6. The device of claim 4, further comprising means for connecting a pair of skis to the articulated platforms, one ski on each platform, each ski having the respective ski boot bound thereto, wherein correction of the cant may be made directly on the ski and ski boot combination.

7. The device of claim 6, wherein the means for connecting the skis to the respective articulated platform is a replacement boot plate, the replacement boot plate having attaching means thereon to attach the respective skis to the replacement boot plate, the respective boot plate having an edge pivotally connected to the first edge of the intermediate plate.

8. The device of claim 6, wherein the respective binders are removably connected to the boot plate, the skis being attached to the respective boot plate to replace the binding means.

9. The device of claim 6, wherein each articulated platform is connected to a beam, the beam being releasable connected to a support means, two sets of articulated platforms, one set having binding means for ski boots attached to the boot plate, the other set having means thereon for attaching a ski to the boot plate, wherein the sets of articulated platforms are interchangeably connected to the respective beams.

10. The device of claim 6, wherein the boot plate is adapted to receive interchangeably, a boot plate insert or a ski, the boot plate insert having binding means for ski boots attached thereto.

11. The device of claim 10, wherein the boot plate is U-shaped, having a base and legs, the base being pivotally connected to the first edge of the intermediate plate, the boot plate having an open segment at approximately the midsection thereof, the open segment extending to an edge of the boot plate opposite the base, the skis being received between the legs of the U-shaped boot plate, binding means on the skis being aligned with and extending upwardly through the open segment of the boot plate and means to secure the skis within the boot plate.

12. The device of claim 1, wherein the vertical indicator has markings thereon to show an angle of 1.5° from a vertical center line.

13. The device of claim 1, wherein the vertical indicator has markings thereon to show a plurality of angles ranging from 0° to 3° on either side from a vertical center line.

14. A device to measure and correct the cant of a ski boot worn by a skier, the device comprising:

a frame having a rotatable platform to which the ski boot is removably attached, wherein the skier wears the boot while supported on the platform, a first vertical indicator means perpendicularly connected to the frame, means to measure an angular relationship between a center of mass of the knee of the skier and the first indicator means, a second indicator attached to the platform, the second indicator indicating the rotation of the platform, indicating the cant, and means to insert a wedge into the device to correct the cant.

15. A device to measure and correct the cant of a ski boot worn by a skier, the skier's knee having a center of mass, the device comprising:

a support for the skier wearing the ski boot, the ski boot having a sole, the support being rotatable about a longitudinal axis with respect to a horizontal plane, an indicator extending upwardly with respect to the horizontal plane, and wherein the support is rotated to align the center of mass of the knee of the skier with the indicator, means to measure an angle of rotation of the sole of the ski boot from the horizontal plane around the longitudinal axis.

16. The method of adjusting the angle of a particular skier's binding with respect to a horizontal plane, wherein tapered wedges are inserted between the binding and the ski, comprising the steps of providing a machine which measures the angle of the center of mass of the particular skier's knee with respect to a vertical plane at right angles to the horizontal plane, providing an indicator means which shows a predetermined angle with respect to the vertical plane, and inserting the tapered wedges until the center of mass of the particular skier's knee coincides with that predetermined angle, thereby easily and conveniently customizing the binding for the particular skier.

17. A method of correcting the cant of a ski boot worn by a skier comprising the steps of:

providing a device having an articulated platform, the articulated platform being laterally movable, a binder attached to the articulated platform to hold the ski boot of the skier, the articulated platform being rotatable about a longitudinal center line, a vertical indicator means extending upwardly perpendicularly from the longitudinal center line and a second indicator means on the articulated platform to measure the degree of rotation of the articulated platform, the skier putting on the ski boot and binding the ski boot to the articulated platform, the skier assuming a normal skiing stance having the skier's feet separated, moving the skier's knee to align a center of mass of the knee a predetermined angle with respect to the vertical indicator, observing the second indicator means and determining a correction for the ski boot, and inserting a wedge in the articulated platform to obtain 0° measurement on the second indicator means.

18. The method of claim 17, wherein the predetermined angle is 1½° inwardly of the vertical indicator.

19. The method of claim 17, wherein means are provided for replacing the binding means on the platform with a ski and attached ski boot.

20. The method of claim 17, wherein a pair of articulated platforms are provided, the platforms being independently laterally moveable with respect to one another, a ski boot being attached to each platform, the skier putting on both ski boots and binding the boots to the respective platforms, moving the skier's knees to align the center of mass of each knee with the respective vertical indicator means, observing each second indicator means to determine the correction for each ski boot, and inserting a corrective wedge in each platform as required.

* * * * *